US008751758B2

(12) United States Patent  (10) Patent No.: US 8,751,758 B2
Garmiza et al.  (45) Date of Patent: Jun. 10, 2014

(54) DELAYED INSTANT COPY OPERATION FOR SHORT-LIVED SNAPSHOTS

(75) Inventors: Ehood Garmiza, Neve Ziv (IL); Eyal Lotem, Omer (IL); Assaf Nitzan, Haifa (IL); Eliyahu Weissbrem, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 13/175,680

(22) Filed: Jul. 1, 2011

(65) Prior Publication Data

US 2013/0007366 A1   Jan. 3, 2013

(51) Int. Cl.
*G06F 12/16* (2006.01)
*G06F 11/14* (2006.01)
*G06F 17/30* (2006.01)

(52) U.S. Cl.
CPC ...... *G06F 17/30088* (2013.01); *G06F 2201/84* (2013.01)
USPC .................... 711/161; 711/162; 711/E12.103

(58) Field of Classification Search
None
See application file for complete search history.

(56) References Cited

U.S. PATENT DOCUMENTS

| 7,243,115 | B2 | 7/2007 | Manley et al. | |
| 7,284,150 | B2* | 10/2007 | Ma et al. | 714/6.23 |
| 7,328,226 | B1* | 2/2008 | Karr et al. | 1/1 |
| 7,640,410 | B2* | 12/2009 | Zohar et al. | 711/162 |
| 7,644,302 | B2* | 1/2010 | Kambara et al. | 714/6.11 |
| 7,720,801 | B2 | 5/2010 | Chen | |
| 8,402,008 | B2* | 3/2013 | Adkins et al. | 707/703 |
| 2003/0159007 | A1* | 8/2003 | Sawdon et al. | 711/154 |
| 2004/0024961 | A1* | 2/2004 | Cochran et al. | 711/112 |
| 2004/0078533 | A1* | 4/2004 | Lee et al. | 711/162 |
| 2004/0158566 | A1* | 8/2004 | Chong et al. | 707/100 |
| 2005/0097288 | A1* | 5/2005 | Holzmann | 711/162 |
| 2005/0240632 | A1* | 10/2005 | Wong et al. | 707/200 |
| 2006/0282627 | A1* | 12/2006 | Aggarwal et al. | 711/154 |
| 2007/0011137 | A1* | 1/2007 | Kodama | 707/1 |
| 2007/0073972 | A1* | 3/2007 | Zohar et al. | 711/129 |
| 2010/0169597 | A1* | 7/2010 | Yonezawa et al. | 711/162 |
| 2010/0205353 | A1* | 8/2010 | Miyamoto et al. | 711/103 |
| 2010/0235591 | A1* | 9/2010 | Akutsu et al. | 711/154 |
| 2011/0178972 | A1* | 7/2011 | Navarro et al. | 706/47 |

FOREIGN PATENT DOCUMENTS

WO    2010002408 A1   7/2008

OTHER PUBLICATIONS

Zhikun Wang et al. "PCOW: Pipelining-Based Cow Snapshot Method to Decrease First Write Penalty." 2008. Springer-Verlag. GPC 2008. LNCS 5036. pp. 266-274.*

Liuba Shira and Hao Xu. "Thresher: An Efficient Storage Manager for Copy-on-write Snapshots." 2006. USENIX. Annual Tech '06. pp. 57-70.*

A.C. Azagury et al., "Advanced functions for storage subsystems: Supporting continuous availability," IBM Systems Journal, vol. 42, No. 2, 2003, pp. 268-279.

* cited by examiner

*Primary Examiner* — Nathan Sadler
(74) *Attorney, Agent, or Firm* — Griffiths & Seaton PLLC

(57) ABSTRACT

A method, including defining a snapshot referencing a source partition of a storage volume on a storage device, and receiving a request to write a block of data to the source partition. Upon receiving the write request, a delayed instant copy operation is initiated by allocating a target partition on the storage device and replacing, in the storage volume, the source partition with the target partition. A definition of a condition for completion of the delayed instant copy operation is received, and the delayed instant copy operation is completed upon the condition being met.

18 Claims, 2 Drawing Sheets

DELAYED INSTANT COPY OPERATION FOR SHORT-LIVED SNAPSHOTS

FIELD OF THE INVENTION

This invention relates generally to computer storage, and specifically to delaying instant copy operations for short-lived snapshots.

BACKGROUND OF THE INVENTION

Snapshots and mirroring are among the techniques employed by data storage facilities for disaster recovery planning. A snapshot may be a copy of data residing on a storage volume (e.g., a disk drive) that is created at a particular point in time. Since a full backup of a large data set can take a long time to complete, a snapshot may define the dataset to be backed up. Data associated with the snapshot is static, and is therefore protected from any subsequent changes to the data on the volume (e.g., a database update).

One typical implementation of a snapshot is called a "pointer snapshot." A pointer snapshot records an index of data locations to be protected on the volume. Pointer snapshots can be created fairly quickly and require far less storage space than is required to maintain a separate copy of the snapshot data.

Mirroring replicates a local storage volume to a separate remote storage volume, in order to ensure redundancy. For a storage facility comprising the local and remote storage volumes, mirroring can be implemented either synchronously or asynchronously. During synchronous mirroring, a host (e.g., a database server) communicating with the storage facility receives a write acknowledgement after data is successfully written to both the local and the remote storage volumes. Synchronous mirroring is typically implemented over a high speed local area network (LAN) or a wide area network (WAN).

During asynchronous mirroring, the host receives the write acknowledgement after the data is written to the local volume (i.e., the remote volume may have not yet received the data and/or may not have acknowledged writing the data). Asynchronous mirroring is typically implemented over lower speed wide area networks, especially over greater distances.

Asynchronous mirroring can be implemented using snapshot-based synchronization. During snapshot-based synchronization, a Most Recent Snapshot (MRS) is defined and compared it to a Last Replicated Snapshot (LRS). Any differences detected when comparing the MRS to the LRS are then conveyed to the remote volume. Upon conveying the differences, the LRS is deleted and the MRS becomes the new LRS. Therefore, snapshots defined during snapshot-based synchronization can be marked as "short-lived", since the MRS and LRS are typically retained for short time periods.

SUMMARY OF THE INVENTION

There is provided, in accordance with an embodiment of the present invention a method, including defining a snapshot referencing a source partition of a storage volume on a storage device, receiving a request to write a block of data to the source partition, initiating a delayed instant copy operation upon receiving the write request, by allocating a target partition on the storage device and replacing, in the storage volume, the source partition with the target partition, receiving a definition of a condition for completion of the delayed instant copy operation, and completing the delayed instant copy operation upon the condition being met.

There is also provided, in accordance with an embodiment of the present invention an apparatus, including a storage device, and a processor configured to define a snapshot referencing a source partition of a storage volume on a storage device, to receive a request to write a block of data to the source partition, to initiate a delayed instant copy operation upon receiving the write request, by allocating a target partition on the storage device and replacing, in the storage volume, the source partition with the target partition, to receive a definition of a condition for completion of the delayed instant copy operation, and to complete the delayed instant copy operation upon the condition being met.

There is further provided, in accordance with an embodiment of the present invention a computer program product, the computer program product including a non-transitory computer readable storage medium having computer readable program code embodied therewith, the computer readable program code including computer readable program code configured to define a snapshot referencing a source partition of a storage volume on a storage device, computer readable program code configured to receive a request to write a block of data to the source partition, computer readable program code configured to initiate a delayed instant copy operation upon receiving the write request, by allocating a target partition on the storage device and to replacing, in the storage volume, the source partition with the target partition, computer readable program code configured to receive a definition of a condition for completion of the delayed instant copy operation, and computer readable program code configured to complete the delayed instant copy operation upon the condition being met.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

One method of writing data to a storage volume implementing snapshots is Instant Copy (ICP), which is described in U.S. Pat. No. 7,640,410, filed on Jul. 21, 2006, and which is incorporated herein by reference. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

Embodiments of the present invention provide methods and systems for delaying the completion of an instant copy (ICP) operation for a snapshot until a defined condition is met. Such a snapshot is herein also termed a short-lived snapshot, and an ICP operation whose completion is delayed is referred to herein as a delayed ICP.

Typically, a delayed ICP operation is initiated when a request is received to write a block of data to a source partition (a partition is typically one megabyte of contiguous data, but may comprise any other convenient data size) on a local storage volume. Prior to receiving the write request a snapshot (i.e., a short-lived snapshot) was defined referencing the source partition. Upon receiving the request, the block of data is typically stored to a cache memory and a new target partition is allocated. To complete the delayed ICP, the source partition in the local storage volume is replaced with the target partition, and the target partition is updated with data from the source partition and the cache.

In some embodiments, the delayed ICP may be cancelled upon the deletion of the short-lived snapshot associated with the delayed ICP. In alternative embodiments, the delayed ICP may be completed if data in the cache reaches a specific threshold, or if the short-lived snapshot has not been deleted after a specific period of time (i.e., a timeout). Therefore completion of a delayed ICP operation may comprise either cancelling or performing the delayed ICP operation. Thus, the defined condition referred to above may be cancellation of the snapshot, data in the cache reaching a threshold, or reaching of a timeout.

A system configured to implement delayed ICP operations for short-lived snapshots may perform fewer storage device input/output (I/O) operations due to the cancellation of delayed ICPs. Additionally, if a delayed ICP is delayed until a Last Replicated Snapshot (LRS) and a Most Recent Snapshot (MRS) are compared, then the system may not actually compare the MRS and the LRS, but assume that the writes that are associated with the delayed ICP's target partition are the differential of the two snapshots, thereby reducing I/O operations and CPU utilization.

System Description

Figure 1:
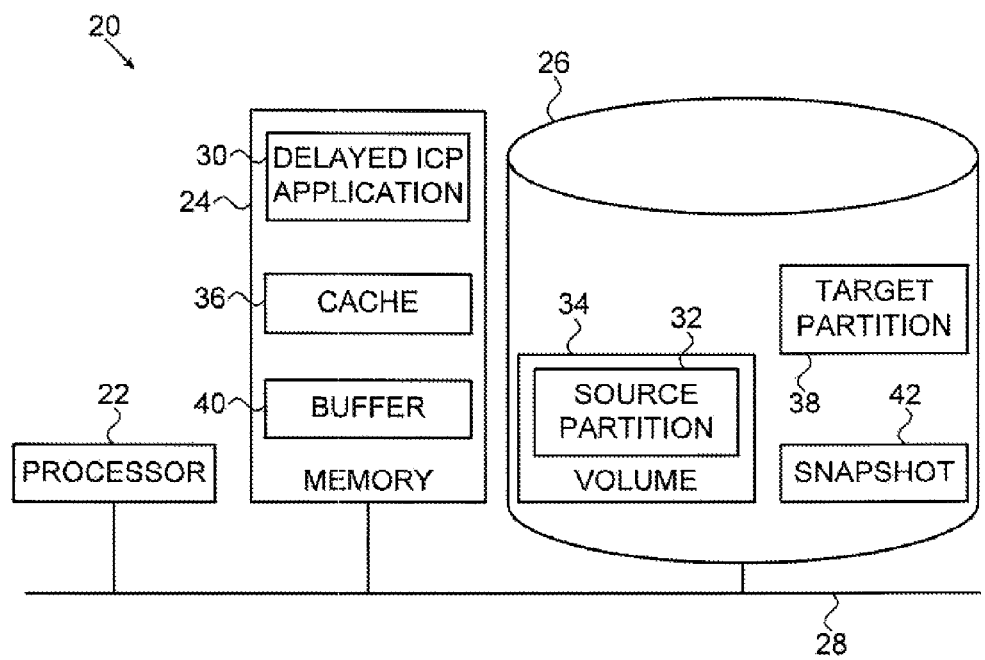
FIG. 1 is a schematic pictorial illustration of a system configured to perform a delayed instant copy operation, in accordance with an embodiment of the present invention.

FIG. 1 is a schematic pictorial illustration of a system 20 configured to perform a delayed instant copy of data in accordance with an embodiment of the present invention. System 20 comprises a processor 22, a memory 24 and a storage device 26, which are all coupled via a bus 28. Processor 22 executes a delayed instant copy (ICP) application 30 from memory 24.

In operation, upon receiving a request to write a block of data to a source partition 32 on a storage volume 34, processor 22 may initially store the block of data to a cache 36 in memory 24. As described in further detail hereinbelow, while creating a delayed ICP, application 30 allocates a target partition 38 on storage device 26 and loads data stored in source partition 32 to a buffer 40 in memory 24.

A snapshot 42 on storage device 26 references source partition 32. Partitions 32 and 38 typically comprise blocks of contiguous data (e.g., one megabyte) on storage device 26. While the configuration in FIG. 1 shows a single source partition 32 and a single target partition 38, storage device 26 typically comprises multiple source and multiple target partitions.

Processor 22 typically comprises a general-purpose computer configured to carry out the functions described herein. Software operated by the processor may be downloaded to the memories in electronic form, over a network, for example, or it may be provided on non-transitory tangible media, such as optical, magnetic or electronic memory media. Alternatively, some or all of the functions of the processor may be carried out by dedicated or programmable digital hardware components, or by using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Delayed Instant Copy

Figure 2:
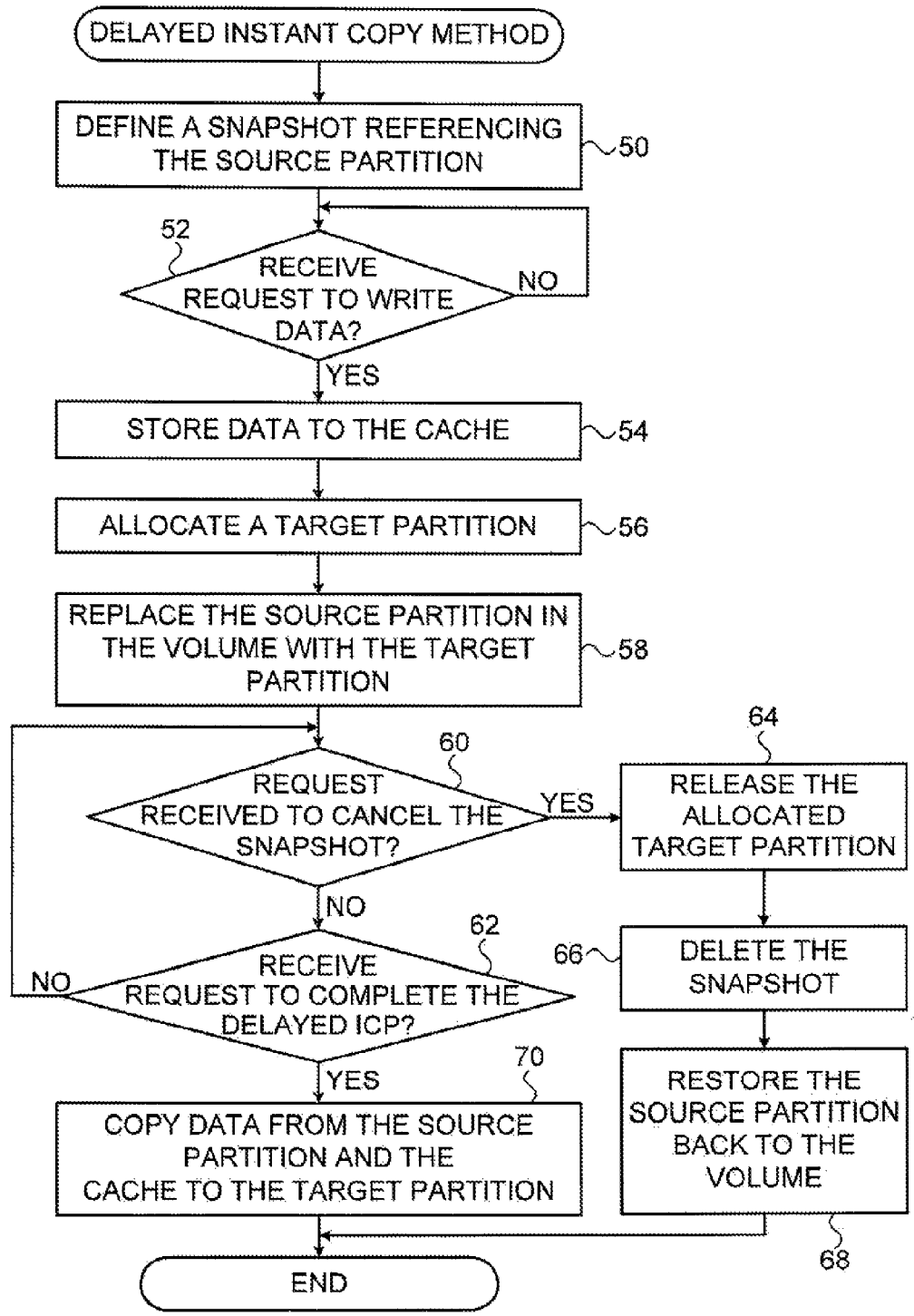
FIG. 2 is a flow diagram that schematically illustrates a method of performing the delayed instant copy operation, in accordance with an embodiment of the present invention.

FIG. 2 is a flow diagram that schematically illustrates a method of performing a delayed instant copy (ICP) operation, in accordance with an embodiment of the present invention. In an initialization step 50, processor 22 defines snapshot 42 so that the snapshot references source partition 32. In a first comparison step 52, processor 22 waits to receive a request to write a block of data to source partition 32. Upon receiving the write request, delayed ICP application 30 initiates a delayed instant copy operation. In a store step 54, delayed ICP application 30 stores the received block of data to cache 36, and in an allocate step 56, the delayed ICP application allocates target partition 38 on storage device 26. Target partition 38 is typically a partition on storage device 26 that has not yet been allocated to any storage volume on the storage device. In a replace step 58, delayed ICP application 30 replaces source partition 32 in storage volume 34 with target partition 38. While source partition 32 is no longer in storage volume 34, snapshot 42 still references the source partition.

If delayed ICP application 30 does not receive a request to cancel snapshot 42 in a second compare step 60, or receive a request to complete the delayed ICP in a third compare step 62, then the method returns to step 60. In other words, delayed ICP application 30 defines one or more conditions for completing the delayed instant copy operation (i.e., to either cancel the snapshot or perform the delayed ICP), and repeatedly performs the second and the third compare steps until one of the defined conditions is met. Conditions for performing (i.e., completing) the delayed ICPs include but are not limited to detecting that data stored in cache 36 reaches a specific threshold, and detecting that the delayed ICP has been active for a specific time period (i.e., a timeout). Processor 22 typically receives definitions of the conditions from an operator of system 20 (not shown).

Returning to step 60, if delayed ICP application 30 receives a request to cancel snapshot 42, then in a release step 64, the delayed ICP application releases target partition 38 back to storage device 26 (i.e., to a pool of non-allocated partitions). In a delete step 66, delayed ICP application 30 deletes snapshot 42, and in a restore step 68, the delayed ICP application completes the method by restoring source partition 32 back to volume 34. Upon delayed ICP application 30 completing the cancellation of snapshot 42, data stored in cache 36 now points to restored source partition 32.

Returning to step 62, if delayed ICP application 30 receives a request to complete the delayed ICP, then in a copy step 70, the delayed ICP application completes the method by copying the data from the source partition and the cache to the target partition. For example, if source partition 32 comprises one megabyte block of contiguous data on storage device 26, and processor 22 receives a request to write a four kilobyte block of data to the source partition, then application 30 loads the one megabyte source partition to buffer 42, updates the memory buffer with the four kilobyte block of data, and stores the buffer to target partition 38.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    defining a snapshot referencing a source partition of a storage volume on a storage device;
    receiving a request to write a block of data to the source partition;
    initiating a delayed instant copy operation upon receiving the write request, by allocating a target partition on the storage device and replacing, in the storage volume, the source partition with the target partition;
    receiving a definition of a condition for completion of the delayed instant copy operation; wherein the condition comprises a cancellation of the snapshot; and
    completing the delayed instant copy operation upon the condition being met.

2. The method according to claim 1, wherein completing the delayed instant copy operation comprises:
    releasing the target partition;
    deleting the snapshot; and
    restoring the source partition to the volume.

3. The method according to claim 1, wherein the condition is selected from a list consisting of the delayed instant copy operation being active for a specific time period and a memory storing the received block of data reaching a specific threshold.

4. The method according to claim 3, wherein completing the delayed instant copy operation comprises:
   loading the source partition to a memory buffer;
   updating the memory buffer with the block of data; and
   storing the updated buffer to the target partition.

5. The method according to claim 1, wherein receiving the request comprises storing the block of data to a cache in a volatile memory.

6. The method according to claim 1, wherein the allocated target partition on the storage device is not in the storage volume.

7. An apparatus, comprising:
   a storage device; and
   a processor configured to define a snapshot referencing a source partition of a storage volume on the storage device, to receive a request to write a block of data to the source partition, to initiate a delayed instant copy operation upon receiving the write request, by allocating a target partition on the storage device and replacing, in the storage volume, the source partition with the target partition, to receive a definition of a condition for completion of the delayed instant copy operation, the condition comprising a cancellation of the snapshot, and to complete the delayed instant copy operation upon the condition being met.

8. The apparatus according to claim 7, wherein the processor is configured to complete the delayed instant copy operation by releasing the target partition, deleting the snapshot, and restoring the source partition to the volume.

9. The apparatus according to claim 7, wherein the processor is configured to select the condition from a list consisting of the delayed instant copy operation being active for a specific time period and a memory storing the received block of data reaching a specific threshold.

10. The apparatus according to claim 9, wherein the processor is configured to complete the delayed instant copy operation by loading the source partition to a memory buffer, updating the memory buffer with the block of data, and storing the updated buffer to the target partition.

11. The apparatus according to claim 7, wherein the processor is configured to receive the request by storing the block of data to a cache in a volatile memory.

12. The apparatus according to claim 7, wherein the allocated target partition on the storage device is not in the storage volume.

13. A computer program product, the computer program product comprising:
   a non-transitory computer readable storage medium having computer readable program code embodied therewith, the computer readable program code comprising:
      computer readable program code configured to define a snapshot referencing a source partition of a storage volume on a storage device;
      computer readable program code configured to receive a request to write a block of data to the source partition;
      computer readable program code configured to initiate a delayed instant copy operation upon receiving the write request, by allocating a target partition on the storage device and replacing, in the storage volume, the source partition with the target partition;
      computer readable program code configured to receive a definition of a condition for completion of the delayed instant copy operation; the condition comprising a cancellation of the snapshot; and
      computer readable program code configured to complete the delayed instant copy operation upon the condition being met.

14. The computer program product according to claim 13, wherein the computer readable program code is configured to complete the delayed instant copy operation by releasing the target partition, deleting the snapshot, and restoring the source partition to the volume.

15. The computer program product according to claim 13, wherein the computer readable program code is configured to select the condition from a list consisting of the delayed instant copy operation being active for a specific time period and a memory storing the received block of data reaching a specific threshold.

16. The computer program product according to claim 15, wherein the computer readable program code is configured to complete the delayed instant copy operation by loading the source partition to a memory buffer, updating the memory buffer with the block of data, and storing the updated buffer to the target partition.

17. The computer program product according to claim 13, wherein the computer readable program code is configured to receive the request by storing the block of data to a cache in a volatile memory.

18. The computer program product according to claim 13, wherein the allocated target partition on the storage device is not in the storage volume.

* * * * *